Figure 1:
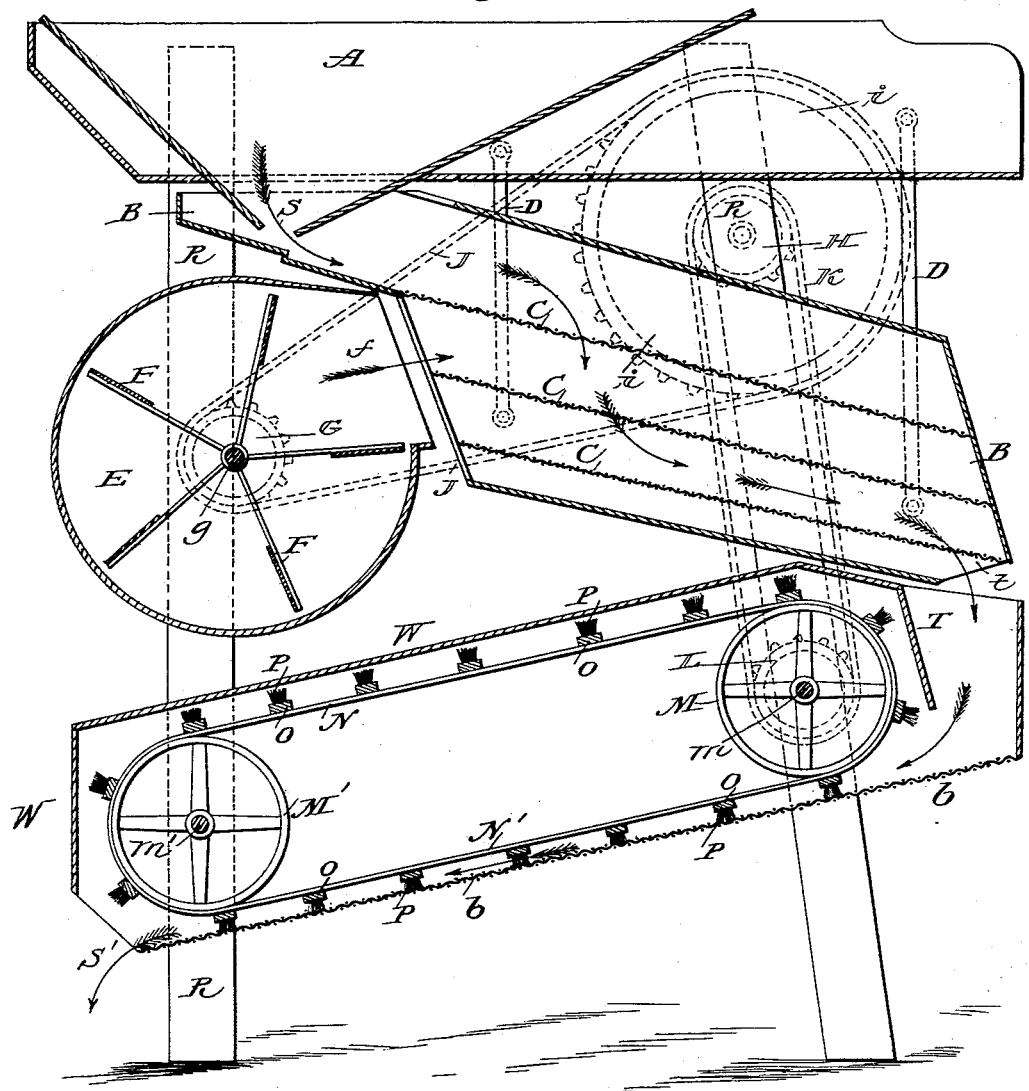

(No Model.) 2 Sheets—Sheet 2.
R. W. ROSSITER.
GRAIN SEPARATOR.
No. 573,706. Patented Dec. 22, 1896.
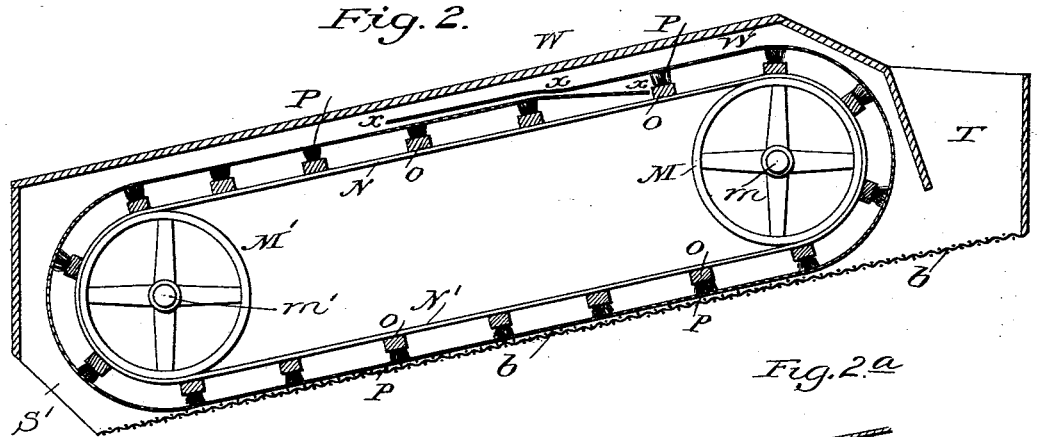
Fig. 2.
Fig. 2a
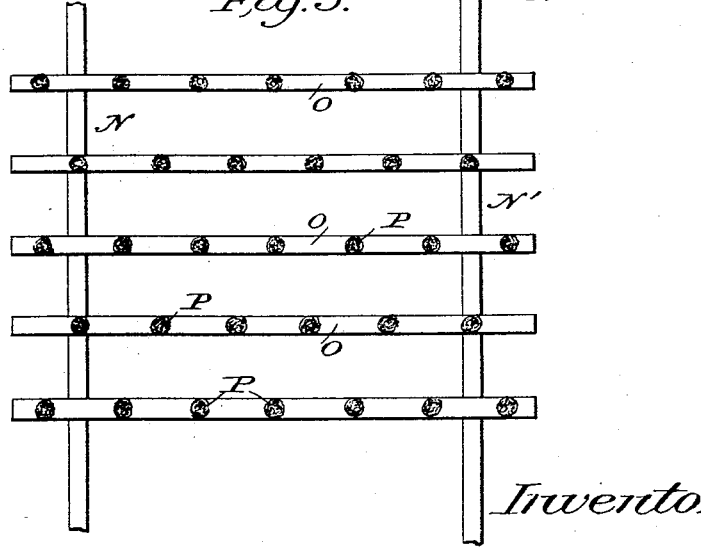
Fig. 3.
Witnesses.
Wm. H. Kline
Edward Francis Rea
Inventor.
Reuben Wellington Rossiter
by E. B. Clark,
Atty.

UNITED STATES PATENT OFFICE.

REUBEN WELLINGTON ROSSITER, OF MINNEAPOLIS, MINNESOTA.

GRAIN-SEPARATOR.

SPECIFICATION forming part of Letters Patent No. 573,706, dated December 22, 1896.

Application filed February 24, 1896. Serial No. 580,586. (No model.)

*To all whom it may concern:*

Be it known that I, REUBEN WELLINGTON ROSSITER, a citizen of the United States, residing at Minneapolis, in the county of Hennepin, State of Minnesota, have invented new and useful Improvements in Grain-Separators, of which the following is a specification.

My invention relates to improved devices for cleaning the different kinds of grain and seeds and for separating wheat or barley from oats, &c.

The object of my invention is to provide simple and effective means for more thoroughly and rapidly separating wheat or barley from oats.

The matter constituting my invention will be defined in the claim.

My improved machine is illustrated in the accompanying drawings, in which—

Figure 1 represents a vertical longitudinal section of the entire machine. Fig. 2 represents a vertical longitudinal section of a screen and chamber containing an endless belt of brush-sections and a traveling belt or apron supported by the brush-sections. Fig. 2ª represents a sectional detail view. Fig. 3 represents a top plan view of part of the belt, showing the brush sections or bars.

The hopper, screens, fan, and operating mechanism are supported on a suitable frame R in a well-known manner. The hopper A for receiving the grain to be cleaned is located at the top, and below it is suspended the shoe B by means of the pivoted straps or hangers D, connecting at their upper ends with the side boards of the hopper, which shoe is adapted to be vibrated or shaken endwise in a well-known manner. Shoe B is slightly inclined downward from its receiving end and is provided with any desired number of sieves or screens C of the proper mesh to allow the grain being cleaned to fall through and be discharged at the tail end thereof. The rear end of the shoe B is preferably closed, except at the lower corner opening $t$ for the discharge of the grain, dust, &c., while the front end is provided with a large opening in line with the discharge-opening $f$ of the fan, as shown in Fig. 1. The fan-drum E is suitably secured to the frame, and within it is arranged the fan F, the blades of which are connected to the transverse shaft $g$, supported in suitable journal-boxes in the frame and having at its outer end a sprocket-wheel G. The shaft $g$ is used as the main driving-shaft and in practice has secured to its outer end a belt-pulley. (Not here shown.) Sprocket-wheels H and $i$ are secured on a suitable stud-shaft at the opposite end of the machine, and a sprocket-chain J is passed over the wheels $i$ and G. A driving-chain K passes around the sprocket-wheel H and the sprocket-wheel L, which is fixed to a transverse shaft $m$ near the lower part of the frame. Two transverse shafts $m$ and $m'$ are supported in journals at opposite ends of the machine and have secured to them the pulleys or rollers M and M', which carry the brush-belt N. The brush-belt is preferably composed of two narrow leather belts N and N', each of which is about three-fourths of an inch wide, and which are connected by transverse wooden bars or slats O, which are preferably made three-fourths of an inch by one inch wide and are riveted to the belts about four inches apart. The slats or bars O are equal in length to the width of the machine.

The tufts P of bristles for forming the brushes are set in the slats O from one to two inches apart, and the tufts in the succeeding slats are so set as to break joints with or rest in lines between those of the adjacent slats, as shown in Fig. 3. The tufts of bristles may be about one-quarter of an inch in diameter and about one-half inch long. The brush-belt, constructed as above described, will sweep a surface between two and three feet wide, or the full width of the machine.

The roller M' is set a little lower on the frame than the roller M, so that the belts and screen shall be inclined downward toward the front of the machine, as shown. A casing W is placed around the tops and sides of the belts N N', and at the bottom is secured the inclined wire-cloth or perforated zinc screen $b$, in position to be swept by the brushes P or the canvas belt. (Shown in Fig. 2.)

When it is desired to separate either wheat or barley from oats, I employ an apron or wide belt of canvas ducking $x$, which is wound tightly around the outside of the brush-belt. One edge of the canvas belt $x$ is provided with hooks $n$, adapted to engage with the eyes or loops $r$, secured in one or more of the slats O, as shown in Fig. 2ª. The eyes $r$ may be secured in two of the slats one-half the length of the belt apart. One end of the belt $x$ having been attached to the slat O, the rollers M are revolved and the brush-belt N caused to travel until the other end of the belt $x$ overlaps the attached end about ten inches, as shown in Fig. 2, when said belt $x$ will be ready for use in separating either wheat or barley from oats. In this operation I preferably use the screen $b$, composed of perforated zinc plates.

The brush-belt with its transverse bars, O, of brushes properly supports the canvas belt $x$, throughout its entire line of travel between the pulleys, and prevents it from vibrating, and therefore it is maintained with a substantially flat surface adjacent to the surface of the screen, and will hold the oats flat and carry them to the delivery end of the screen at S'. While the canvas belt is thus sufficiently flat to carry forward the oats, it is yet sufficiently yielding by reason of the bristle backing to permit the grains of wheat or barley to turn and pass endwise through the holes of the screen. This flat but yielding support for the canvas belt is quite an important feature in my separator and has proved very effective in practical operation. Since the canvas belt is maintained flat throughout its course, there can be no accumulation of straw or oats on any part of the screen and the oats cannot up-end and pass through the holes of the screen.

The machine being put in operation, the grain to be cleaned and separated is deposited in the hopper A, and is discharged therefrom at the bottom opening S onto the sieves C C, through which the grains pass and which finally discharge into the hopper T, from which they pass onto the screen $b$. The dust is blown out at the tail-opening $t$ of the shoe B. As the brush-belt N N' is traversed by the revolving rollers the brushes P continuously sweep the screen $b$, keeping the grains in motion and gradually conveying the same to the discharge end, and at the same time push through the meshes or holes all foul and worthless seeds, which are deposited below the screen, while the sound grain may be caught in a suitable receptacle at the discharge end S'. When it is desired to separate either wheat or barley from oats, the canvas apron or belt $x$ is quickly attached by its hooks to one of the slats O, so as to wrap such belt around the brush-belt. The machine is then again started and the mixed grain fed, as above described, into the hopper T, and the separation takes place as above described.

Having described my invention, what I claim, and desire to secure by Letters Patent, is—

In a grain cleaning and separating machine, the combination with a perforated screen, of a pair of rollers, a brush-belt thereon having transverse brush-slats, and a canvas belt or apron drawn over said brush-belt, and yieldingly supported by the transverse brush-slats for holding it flat and preventing vibration thereof, substantially as described.

REUBEN WELLINGTON ROSSITER.

Witnesses:
EDWARD FRANCIS REA,
WILLIAM HENRY KLINE.